(12) United States Patent
Nava

(10) Patent No.: US 10,599,943 B2
(45) Date of Patent: Mar. 24, 2020

(54) CIRCUIT BOARD TEXT RECOGNITION

(71) Applicant: SKYWORKS SOLUTIONS, INC., Woburn, MA (US)

(72) Inventor: Carlos Fabian Nava, Mexicali (MX)

(73) Assignee: Skyworks Solutions, Inc., Woburn, MA (US)

(*) Notice: Subject to any disclaimer, the term of this patent is extended or adjusted under 35 U.S.C. 154(b) by 0 days.

(21) Appl. No.: 16/376,422

(22) Filed: Apr. 5, 2019

(65) Prior Publication Data

US 2019/0236392 A1    Aug. 1, 2019

Related U.S. Application Data

(63) Continuation of application No. 15/612,730, filed on Jun. 2, 2017, now Pat. No. 10,255,513.

(60) Provisional application No. 62/344,624, filed on Jun. 2, 2016.

(51) Int. Cl.
| | |
|---|---|
| *G06K 9/32* | (2006.01) |
| *G06K 9/46* | (2006.01) |
| *G06K 9/18* | (2006.01) |
| *G06K 9/62* | (2006.01) |

(52) U.S. Cl.
CPC ............ *G06K 9/325* (2013.01); *G06K 9/18* (2013.01); *G06K 9/4638* (2013.01); *G06K 9/6276* (2013.01); *G06K 2209/01* (2013.01)

(58) Field of Classification Search
CPC ........ G06K 9/325; G06K 9/6276; G06K 9/18; G06K 9/4638; G06K 2209/01
USPC .......................................................... 382/147
See application file for complete search history.

(56) References Cited

U.S. PATENT DOCUMENTS

| | | | | |
|---|---|---|---|---|
| 2007/0110322 | A1* | 5/2007 | Yuille | G06K 9/325 |
| | | | | 382/227 |
| 2010/0310172 | A1* | 12/2010 | Natarajan | G06K 9/00865 |
| | | | | 382/187 |
| 2012/0308122 | A1* | 12/2012 | Zhu | G06K 9/6201 |
| | | | | 382/155 |
| 2015/0130925 | A1* | 5/2015 | Park | G01N 21/95684 |
| | | | | 348/87 |

* cited by examiner

*Primary Examiner* — Amandeep Saini
(74) *Attorney, Agent, or Firm* — Chang & Hale LLP

(57) ABSTRACT

Techniques and systems for recognizing characters on a circuit board are discussed herein. For example, a digital image of a character on a circuit board can be obtained. The digital image can be processed with a gradient, structural, and concavity algorithm. The processing can include identifying a gradient feature based on a stroke shape, identifying a structural feature based on a stroke trajectory, identifying a concavity feature based on a stroke relationship, and so on. The character can be classified based on the gradient feature, the structural feature, and/or the concavity feature. The classifying can be performed using a k-nearest neighbor classifier algorithm and/or a distance metric.

20 Claims, 7 Drawing Sheets

CIRCUIT BOARD TEXT RECOGNITION

CROSS-REFERENCE TO RELATED APPLICATION(S)

This application is a continuation of U.S. application Ser. No. 15/612,730 filed Jun. 2, 2017, entitled SYSTEMS AND METHODS FOR RECOGNITION OF UNREADABLE CHARACTERS ON PRINTED CIRCUIT BOARDS, which claims priority to U.S. Provisional Application No. 62/344,624 filed Jun. 2, 2016, entitled OPTICAL CHARACTER RECOGNITION ON PRINTED CIRCUIT BOARDS, the benefits of the filing dates of which are hereby claimed and the disclosures of which are hereby expressly incorporated by reference herein in their entirety.

BACKGROUND

Field

The present disclosure relates to systems and methods for recognition of unreadable characters on printed circuit boards.

Description of the Related Art

In many electronics applications, a printed circuit board such as a panel of packaging substrate is utilized to manufacture multiple packaged modules. Such a packaged module can then be installed in an electronic device to provide desired functionality for the electronic device. For example, a packaged module can be configured to provide wireless functionality, and such a packaged module can be installed on a wireless device.

SUMMARY

In accordance with some teachings, the present disclosure relates to a method for recognizing characters imprinted on a printed circuit board. The method includes obtaining a digital image for each of a plurality of characters on the printed circuit board, and dividing each digital image into an array of regions. The method further includes generating a data structure from the arrays of the digital images. The data structure includes gradient features based on stroke shapes on small distances, structural features based on stroke trajectories on extended distances, and concavity features based on stroke relationships.

In some embodiments, the method can further include obtaining another image of a character and performing a character recognition step based on the data structure. The character recognition step can be performed with a k-nearest neighbor classifier algorithm and a distance metric. The distance metric can include a Euclidian Distance parameter.

In some embodiments, the gradient features, the structural features, and the concavity features can be obtained with a gradient, structural and concavity (GSC) algorithm. The gradient features can be obtained by two dimensional convolutions of each digital image with Sobel operators. The structural features can be obtained by adding zero padded borders to the array of each digital image, and seeking gradient patterns among array elements immediately surrounding each non-padded border array element. The concavity features can be obtained by generating a coarse pixel density of the array of each digital image, the coarse pixel density including a threshold applied to a count of all character pixels among the respective array. The concavity features can be further obtained by generating large-stroke information for the array of each digital image, with the large-stroke information including a threshold applied to a histogram of pixels strokes in each of horizontal pixels and vertical pixels. The concavity features can be further obtained by generating upward, downward, left, right and hole information for the array of each digital image, with the upward, downward, left, right and hole information including rays formed to hit the character pixels to thereby determine presence of additional character pixels or holes.

In some embodiments, the data structure can further include a character class block representative of recognizable characters. The recognizable characters can include, for example, numeric characters 0 to 9.

In some implementations, the present disclosure relates to a method for recognizing characters imprinted on a printed circuit board. The method includes obtaining a digital image of a character on the printed circuit board. The method further includes performing an optical character recognition process on the digital image using trained information that includes gradient features based on stroke shapes on small distances, structural features based on stroke trajectories on extended distances, and concavity features based on stroke relationships.

According to some implementations, the present disclosure relates to a system for processing printed circuit boards. The system includes a first production system configured to fabricate a plurality of printed circuit boards, with each printed circuit board including a plurality of characters imprinted thereon to provide information about the printed circuit board. The system further includes a character recognition system configured to monitor at least some of the printed circuit boards. The character recognition system includes an imaging component configured to obtain a digital image of the characters on a selected printed circuit board, and a processor configured to perform an optical character recognition process on the digital image using trained information that includes gradient features based on stroke shapes on small distances, structural features based on stroke trajectories on extended distances, and concavity features based on stroke relationships.

In some embodiments, the character recognition system can further include a storage component in communication with the processor and configured to store the trained information.

In some embodiments, the processor ca be further configured to generate a data structure for the trained information. The processor can generate the data structure by obtaining a digital image for each of a plurality of characters on a selected printed circuit board, dividing each digital image into an array of regions, and generating the data structure from the arrays of the digital images, the data structure including the gradient features, the structural features, and the concavity features.

In some embodiments, the system can further include a second production system configured to produce individual modules from each of at least some of the printed circuit boards fabricated by the first production system. Each printed circuit board can be implemented as a packaging substrate panel having an array of modules joined together, such that the joined modules become the individual modules upon singulation by the second production system. In some embodiments, each individual module can be configured to provide a wireless functionality.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1:
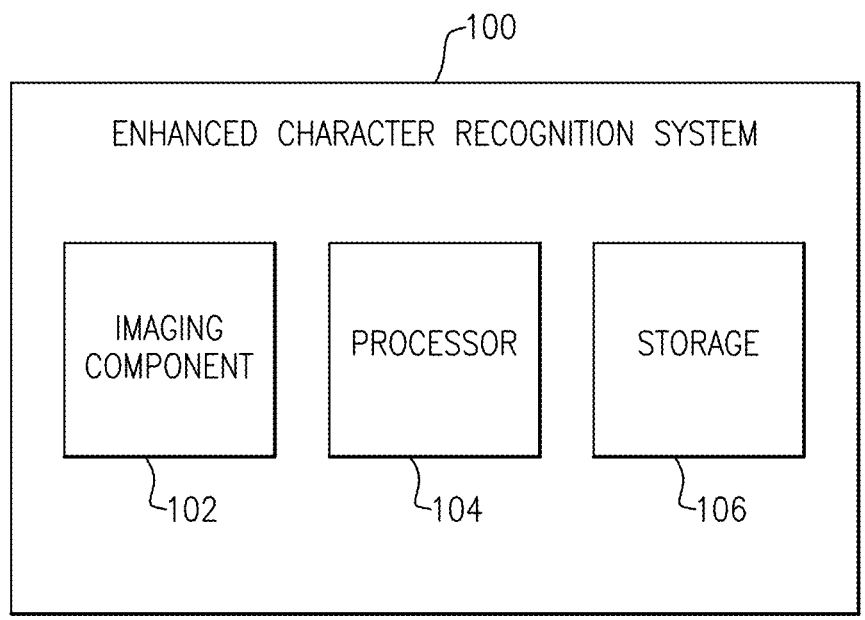
FIG. 1 depicts an enhanced character recognition system having one or more features as described herein.

FIG. 1 depicts an enhanced character recognition system 100 that can be configured to provide one or more features as described herein. In some embodiments, such a system can include an imaging component 102 for obtaining an image of a printed circuit board (PCB). Such an imaging component can include, for example, an imaging sensor and optics for forming an image of the PCB on the imaging sensor.

As shown in FIG. 1, the enhanced character recognition system 100 can further include a processor 104 configured to process the image obtained from the imaging sensor. The processor 104 can also be configured to provide functionalities associated with one or more features as described herein.

As shown in FIG. 1, the enhanced character recognition system 100 can further include a storage component 106 configured to provide storage functionality. In some embodiments, such a storage component can provide non-volatile storage of, for example, the image, and information associated with the processing of the image. The storage component 106 can also be configured to provide non-volatile storage of algorithms, data, lookup tables, etc. that can be utilized to facilitate operation of the enhanced character recognition system 100.

Figure 2:
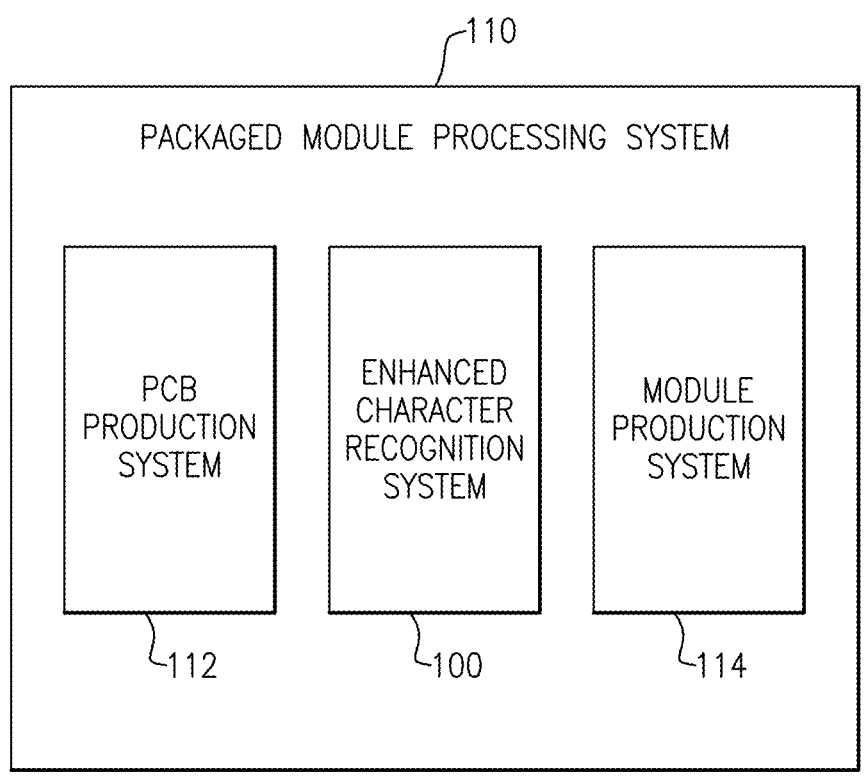
FIG. 2 shows that in some embodiments, the enhanced character recognition system of FIG. 1 can be utilized in a manufacturing system such as a packaged module processing system.

FIG. 2 shows that in some embodiments, the enhanced character recognition system 100 of FIG. 1 can be utilized in a manufacturing system such as a packaged module processing system 110. Such a packaged module processing system can include a PCB production system 112 configured to fabricate, for example, panels with each panel having an array of partially or fully completed modules that are joined together. Such a panel can be singulated to produce a number of individual packaged modules. In some embodiments, such singulated packaged modules can be substantially complete, or be processed further. Handling and/or further processing of the packaged modules can be achieved by a module production system 114. Among others, examples related to production of such packaged modules are described in U.S. Pat. No. 9,355,444 titled SYSTEMS AND METHODS FOR PROCESSING PACKAGED RADIO-FREQUENCY MODULES IDENTIFIED AS BEING POTENTIALLY DEFECTIVE which is expressly incorporated by reference in its entirely, and its disclosure is to be considered part of the specification of the present application.

As shown in FIG. 2, the packaged module processing system 110 can further include the enhanced character recognition system 100 of FIG. 1. In some embodiments, such an enhanced character recognition system can improve the efficiency of the packaged module processing system 110 and therefore improve the production yield of the packaged modules.

In some embodiments, the enhanced character recognition system 100 of FIGS. 1 and 2 can be configured to provide one or more features as described herein. For the purpose of description, it will be understood that a PCB can include, for example, a panel having an array of joined modules based on a packaging substrate such as a laminate substrate or a ceramic substrate. Such modules can be any electronic modules, including modules associated with wireless applications.

In some embodiments, the enhanced character recognition system 100 of FIGS. 1 and 2 can be configured to provide optical character recognition by implementing a Gradient, Structural, Concavity (GSC) algorithm to extract features of damaged, unreadable and/or incomplete numerical digit characters from images on printed board circuits (PCBs). By way of examples, grayscale color images can be acquired from a charge-coupled device (CCD) camera, and a dataset of 500 matrix images samples for the character digits 0 to 9 can be assembled. A GSC feature extraction technique can be applied to obtain characteristics that will be used in a character recognition step. Experimental results show that applying the GSC algorithm to extract the features and using a kNN classifier with Euclidian Distance can improve optical character recognition (OCR) detectability of damaged characters from about 95% to more than 97%.

Optical character recognition (OCR) is a technique used to convert characters from a digital image to a digital text. OCR algorithms are typically based on one of two techniques.

The first technique is related to matching of matrix images, where an alphabet of stored character images is used to compare with an input image. This pattern matching does not work well when new fonts are encountered or input character images are unreadable.

The second technique decomposes an input image to extract principal features. Then, classifiers are used to compare the input image features with some stored image features and choose the best match.

In some manufacturing applications, one of the foregoing OCR techniques (e.g., the pattern matching technique) can be utilized. In such a pattern matching technique, a vision system reads identification characters on printed circuits boards (PCBs), where the characters provide processing information such as lot integrity and machine control.

In some situations, the foregoing pattern matching technique is not robust enough because many of the images on the PCBs present some damage on characters due to, for example, dirt and/or as a result of bad previous processes. In an example manufacturing application, actual OCR detectability is found to be around 95%. In such a manufacturing application, the pattern matching process starts with a monochrome VGA image acquisition of a portion of a PCB (e.g., upper left section of a PCB), using a camera such as a NI-1752 smart camera, with full resolution, 640×480 pixels and maximum data transfer @60 fps using a GigE port. Assuming that the selected resolution and data transfer speed parameters meet the production rate of inspected PCBs, such a camera generates a grayscale output image type with a maximum character resolution to cover the entire PCB characters of interest.

Figure 3:
FIG. 3 shows an example of an image of a printed circuit board where characters are undamaged.

FIG. 3 shows an example of such an output image where the PCB characters are undamaged. In FIG. 3, the output image indicated as 200 is clearly show characters "1314838005."

Figure 4:
FIG. 4 shows an example of an image of a printed circuit board where some characters are damaged.
Figure 5:
FIG. 5 shows another example of an image of a printed circuit board where some characters are damaged.

Due to some problems with one or more previous processes in the production line, some PCBs can have some residual dirt or other undesirable material over the characters, making some characters unreadable for the pattern matching technique. FIGS. 4 and 5 show examples of output images of PCBs where residual dirt over the characters are evident. In the example of FIG. 4, the output image indicated as 202 shows some characters being sufficiently clear (e.g., "5659" in positions 4 to 7), while other characters have different degrees of readability. Similarly, in the example of FIG. 5, the output image indicated as 204 shows some characters being sufficiently clear, while other characters have reduced readability due to a length of a smear mark at the bottom portion of the characters.

It is noted that in the examples of FIGS. 4 and 5, some or all of the damaged characters may be recognizable with sufficient accuracy by a human operator. However, involvement of operators for such intervention typically results in a lower throughput than the automatic OCR process. For example, such human operator intervention can involve manually writing down the information from a screen when the OCR process fails, thereby increasing the process time. Further, possible errors can arise from wrong reading of the characters and/or interpretation of the damaged characters, inducing higher production costs.

Figure 6:
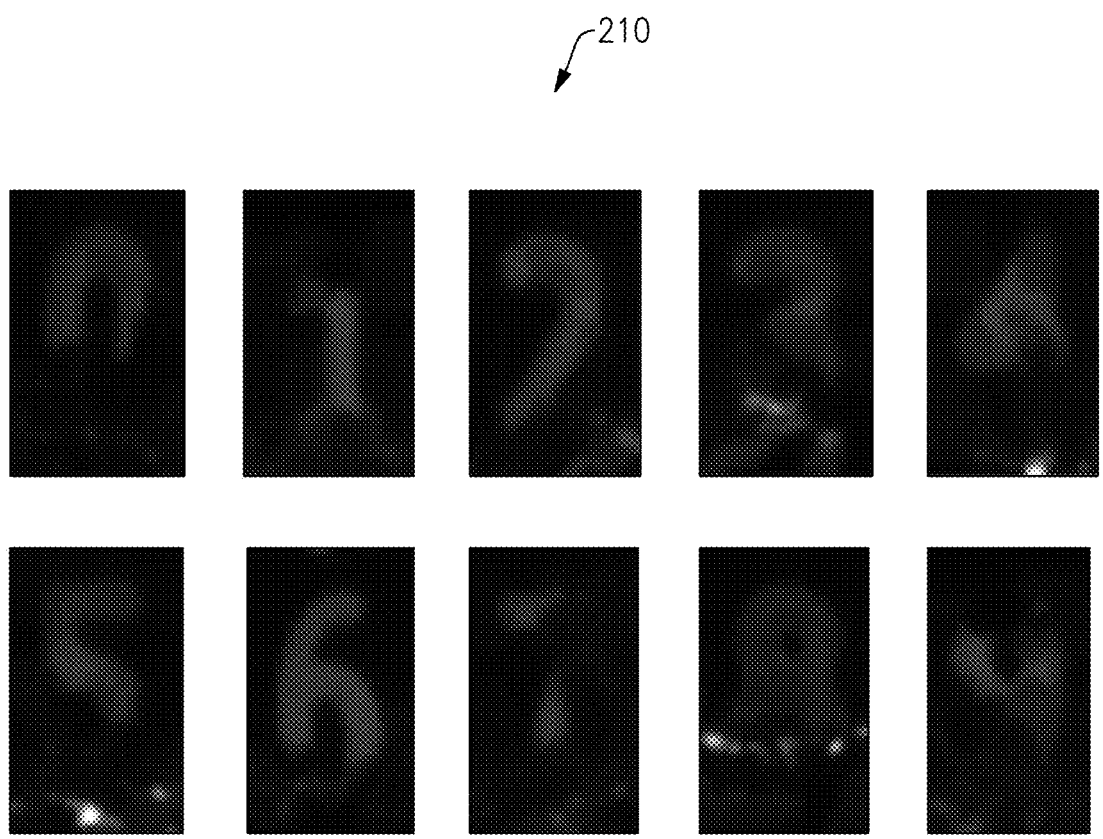
FIG. 6 shows examples of damaged digit images.

Disclosed herein are examples related to systems and methods for implementation of a character recognition technique for unreadable characters using Gradient, Structural and Concavity (GSC) extraction features and K-Nearest Neighbor Classifier using Euclidian Distance. To demonstrate the enhancement of character recognition efficiency, following experimental data set was utilized: 500 character images, with 50 images corresponding to each numerical digit from 0 to 9. FIG. 6 shows some examples of damaged digit image samples.

Figure 7:
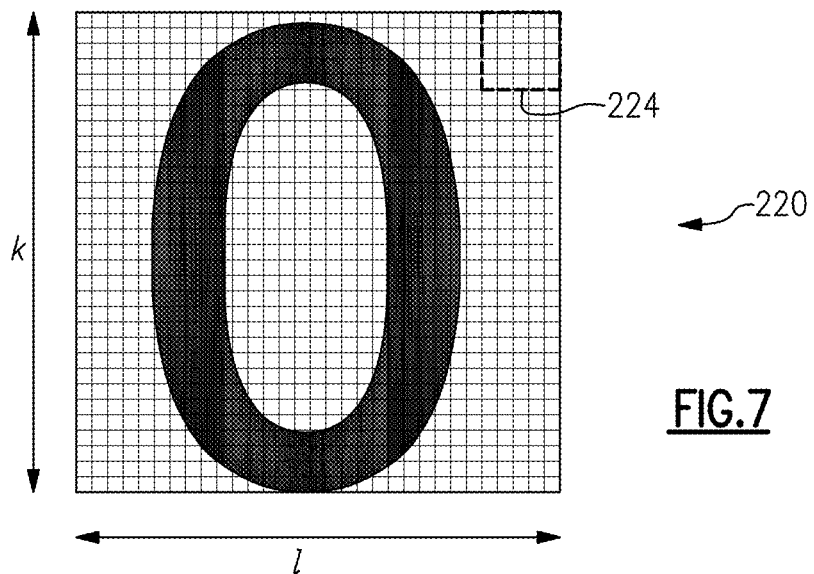
FIG. 7 shows that a digit image can include an array of pixels.

The foregoing example data set can be pre-processed as follows. For the purpose of description, and as shown in FIG. 7, let $l_i$ be any digit image 220 of size (k,l) in the dataset $\forall l_i$. In the example of FIG. 7, k=50 and l=30 to yield a 50×30 matrix for the digit image 220.

Such a digit image can be converted to gray-scale (e.g., if the images are RGB type). Then, a threshold can be applied to binarize the matrix of the digit image 220.

Following the foregoing binarization, the digit image $l_i$ can be split into a number of non-overlapping regions. For example, a region indicated as 224 in FIG. 7 includes 5×5 array of elements, such that the digit image 220 includes 60 non-overlapping regions (10 along the k direction, and 6 along the l direction).

Figure 8:
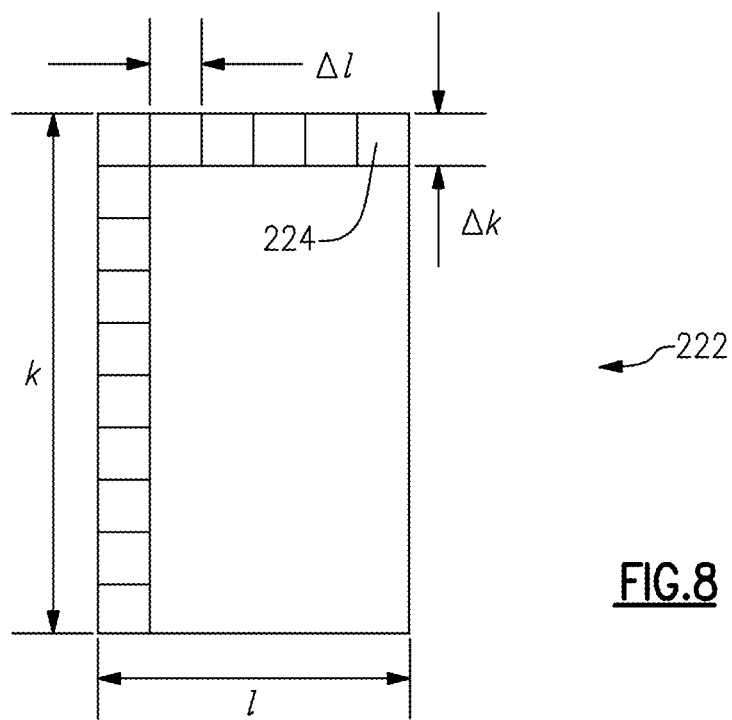
FIG. 8 shows that the array of pixels can be grouped into an array of non-overlapping regions.

FIG. 8 shows the digit image of FIG. 7 in terms of the non-overlapping regions 224. Each overlapping region 224 is shown to have dimensions $\Delta k$ and $\Delta l$, with $\Delta k=\Delta l=5$ pixels in the foregoing example.

In some embodiments, a Gradient, Structural and Concavity (GSC) recognition algorithm can be utilized to extract information from an image. Such a technique can construct features of an image by applying a three-step feature extraction process. First, a gradient step can detect local features by analyzing a stroke shape on small distance. Second, a structural step can extract features from stroke trajectories by extending distances of gradient. Third, a concavity analysis can detect stroke relationships across the image.

Figure 9:
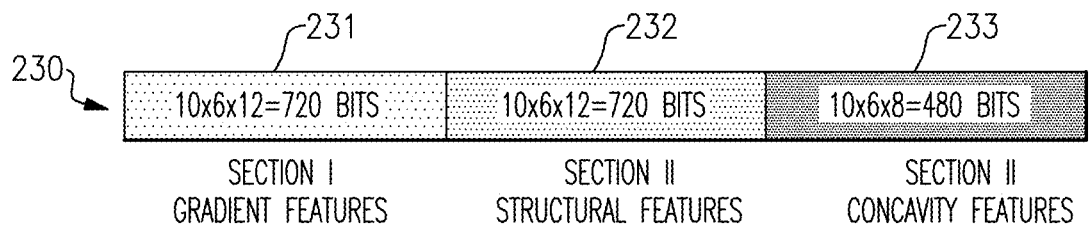
FIG. 9 depicts an example of a data structure that can be constructed to include various features to facilitate enhanced recognition of characters.

FIG. 9 depicts an example data structure 230 that can be constructed based on the foregoing three-step extraction process. For the purpose of description, such a data structure can be referred to as a Total Feature Vector (TFV) constructed for each image. In such a TFV, the first section 231 can include gradient features associated with the first step; and data in the first section 231 can be arranged in, for example, 720 bits (10×6 regions times 12-bits per region). Similarly, the second section 232 can include structural features associated with the second step; and data in the second section 232 can be arranged in, for example, 720 bits (10×6 regions times 12-bits per region). Similarly, the third section 233 can include concavity features associated with the third step; and data in the third section 233 can be arranged in, for example, 480 bits (10×6 regions times 8-bits per region). Examples of how the features in the three sections of the TFV can be obtained are described herein in greater detail.

In some embodiments, to obtain the gradient features for the first section of the TFV, two dimensional convolutions in X and Y directions can be applied to obtain the gradient features using, for example, 3×3 Sobel operators on the original $l_i$ binary image. Examples of such 3×3 Sobel operators are as follows in Equations 1 and 2:

$$K_x = \begin{bmatrix} -1 & 0 & 1 \\ -2 & 0 & 2 \\ -1 & 0 & 1 \end{bmatrix}, \quad (1)$$

$$K_y = \begin{bmatrix} -1 & -2 & -1 \\ 0 & 0 & 0 \\ 1 & 2 & 1 \end{bmatrix}. \quad (2)$$

In some embodiments, the gradient features can be expressed as $G_x$ and $G_y$ (Equations 3 and 4) that are the two dimensional convolutions in the X and Y directions, of a 3×3 matrix M for every pixel in the original $1_i$ digit image matrix. An extra zero padded border is added to $1_i$ in this example.

$$G_x = K_x * M, \quad (3)$$

$$G_y = K_y * M, \quad (4)$$

Figure 10:
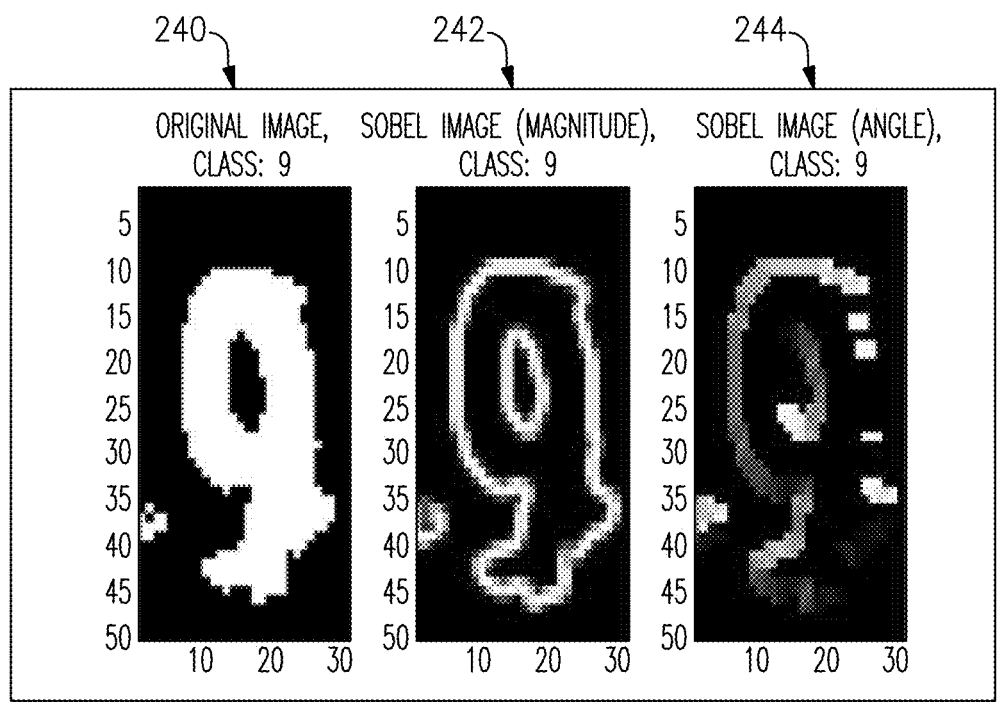
FIG. 10 shows gradient magnitude and direction representations of an example digit character "9."

FIG. 10 shows gradient magnitude and direction representations of an example digit character "9," obtained from the foregoing two dimensional convolutions. More particularly, an image indicated as 240 is an original image of the digit character 9; an image indicated as 242 is a Sobel image (magnitude) of the digit character 9; and an image indicated as 244 is a Sobel image (angle) of the digit character 9.

Figure 11:
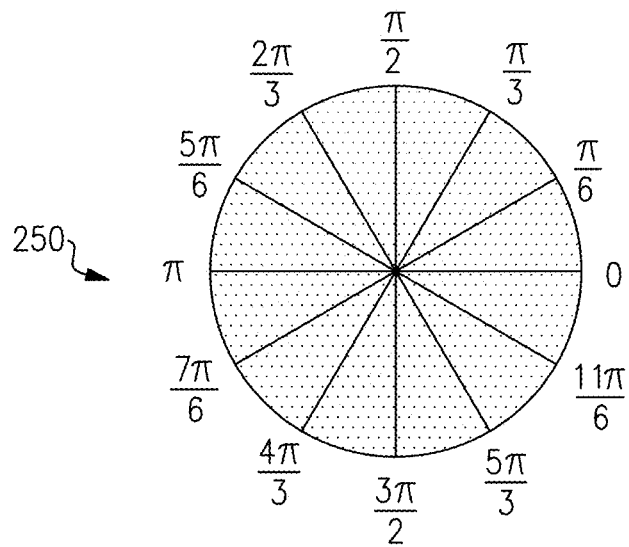
FIG. 11 depicts an example of gradient angle bins that can facilitate generation of gradient features.

Based on the foregoing gradient information, a histogram can be applied for each of the 60 non-overlapping regions (224 in FIG. 8) of the complete image grid, incrementing a respective counter for every gradient angle that falls in each region. An example of such gradient angle bins is depicted as 250 in FIG. 11, with each bin having a 30-degree size. Then, a threshold can be applied, and a final 720 bits of gradient features information can be created for the first section of the TFV.

Figure 12:
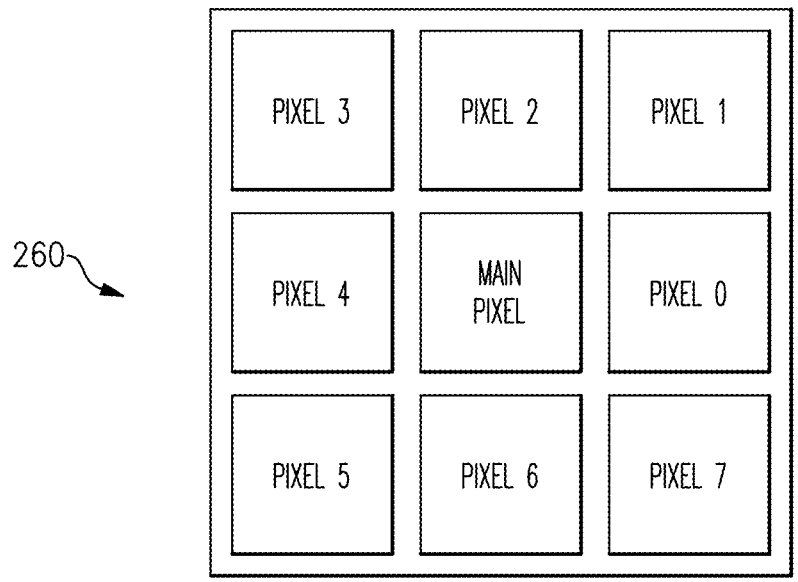
FIG. 12 depicts an arrangement of non-overlapping regions of an image that can be utilized to obtain structural features.

In some embodiments, to obtain the structural features for the second section of the TFV, the following technique can be utilized. For each pixel of the expanded $1_i$ digit image with the zero padded border, a set of 12 rules can be applied using 8 pixels around the main pixel. Such an arrangement is depicted in FIG. 12 as 260.

In some embodiments, these rules can be implemented to look for specific gradient patterns form with the nearest pixels, such as horizontal lines (Pixel 0, Pixel 4), vertical lines (Pixel 2, Pixel 6), diagonals [(Pixel 5, Pixel 1), (Pixel 3, Pixel 7)] and corners [(Pixel 0, Pixel 2), (Pixel 2, Pixel 4), (Pixel 4, Pixel 6), (Pixel 6, Pixel 0)].

Based on the foregoing 12 rules, a threshold can be applied for each of the 12 rules result, for each of the 60 non-overlapping regions to binarize the complete set. A final 720 bits of structural features can be created for the second section of the TFV.

In some embodiments, to obtain the concavity features for the third section of the TFV, the following technique can be utilized. Three feature sections can be implemented to form the last part of the GSC recognition algorithm.

First, a coarse pixel density can be obtained. More particularly, a histogram can be applied to count all the character pixels at each of the 60 non-overlapping regions. Then, a threshold can be applied to binarize the result. For such a process, a 60-bits new set can be included as the first part of the concavity features.

Second, a large-stroke information can be obtained. More particularly, similar to the first part, two histograms can be applied, one for the horizontal and one for the vertical pixels strokes in each direction. A threshold can be applied to binarize the result. For this part, a 120-bits (2×60) new set can be included as the second part.

Third, information about upward, downward, left, right and holes can be obtained. More particularly, in this last part of the concavity features, for every pixel in each of the 60 non-overlapping regions, rays can be formed to hit character pixels, borders and checked to see if there are holes or character pixels in all directions. For this part, a 300-bits (5×60) new set can be included as the third part.

Based on the foregoing three parts of the concavity features, and as described herein in reference to FIG. 9, the example TFV for the third section (concavity features) has the following set of bits: 1× (10×6)+2× (10×6)+5× (10×6)=480 bits.

In some embodiments, a k-Nearest Neighbor Classifier algorithm can be utilized for a damaged character recognition step. Such an algorithm can be suitable for recognition of damaged characters due to its simplicity and fast performance, and the absence of prior assumptions about data set probability distributions. In such an algorithm, classification occurs when a majority vote among k-nearest neighbors with respect to any particular test set is given. In the example experiments described herein, k parameter was fixed to 3.

Based on the various techniques described herein, a data structure can be produced. For the purpose of description, such a data structure can be referred to as a total feature matrix, and an example of such a total feature matrix is depicted (as 270) in FIG. 13.

Figure 13:
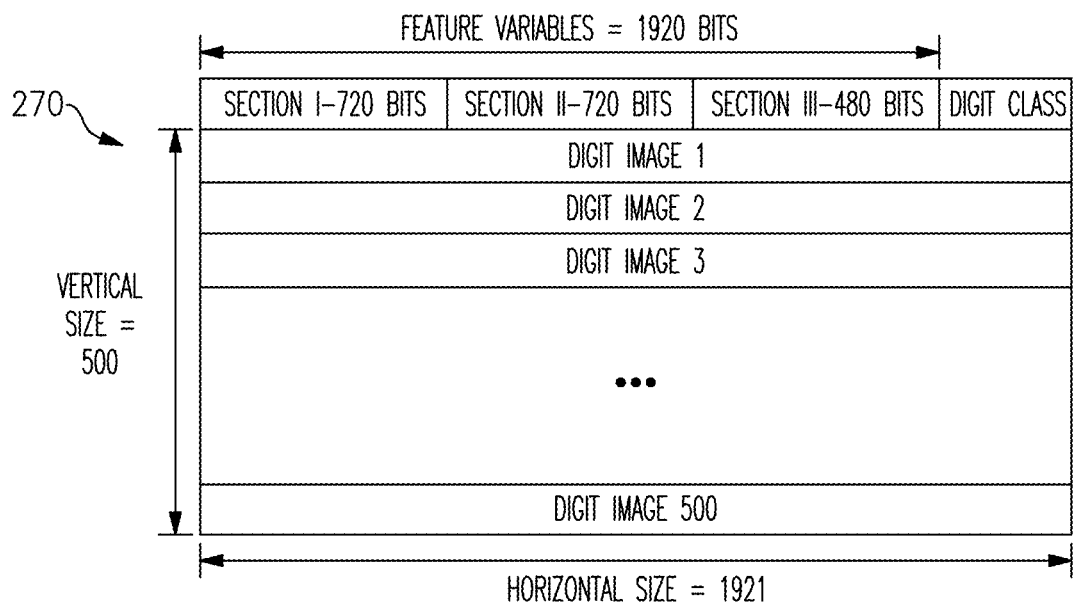
FIG. 13 depicts a larger data structure that includes the data structure of FIG. 9 and data associated with a number of digital images.

In the total feature matrix 270 of FIG. 13, a digit class (0 to 9) is shown to be added at the end column of the TFV data structure 230 of FIG. 9. Following the foregoing TFV+digit class data structure, the total feature matrix 270 is shown to include images of the 500 digit samples.

With the total feature matrix 270 of FIG. 13, various configurations for enhancement to optical recognition of characters can be tested. In an example approach, a technique commonly referred to as Euclidian Distance (Equation 5) can be selected to compute the distance metric.

$$D_{Euclidian} = \sqrt{\Sigma_{i=1}^{l}(Test_i - Training_i)^2}. \quad (5)$$

Figure 14:
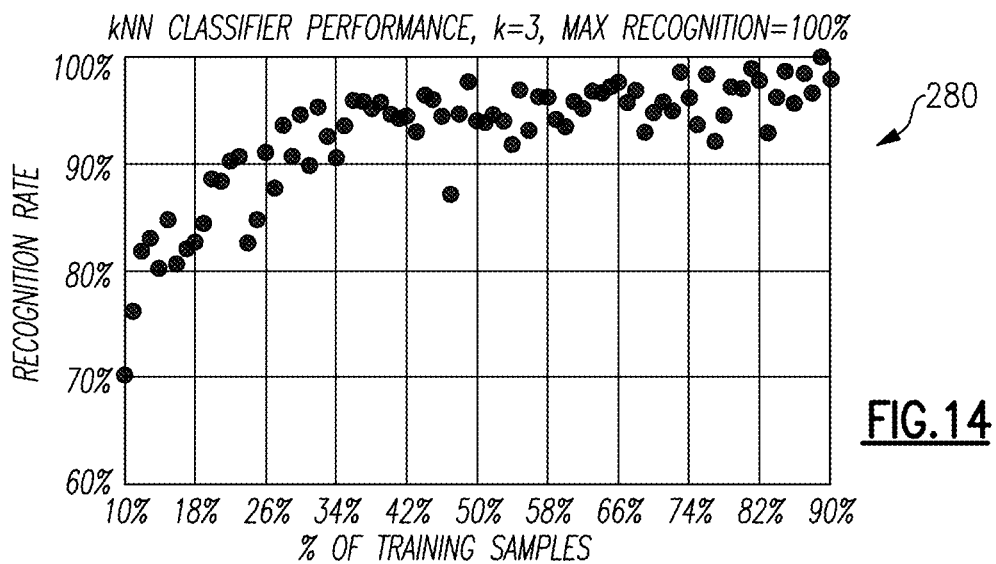
FIG. 14 shows a plot of results from a test of the enhanced character recognition system.
Figure 15:
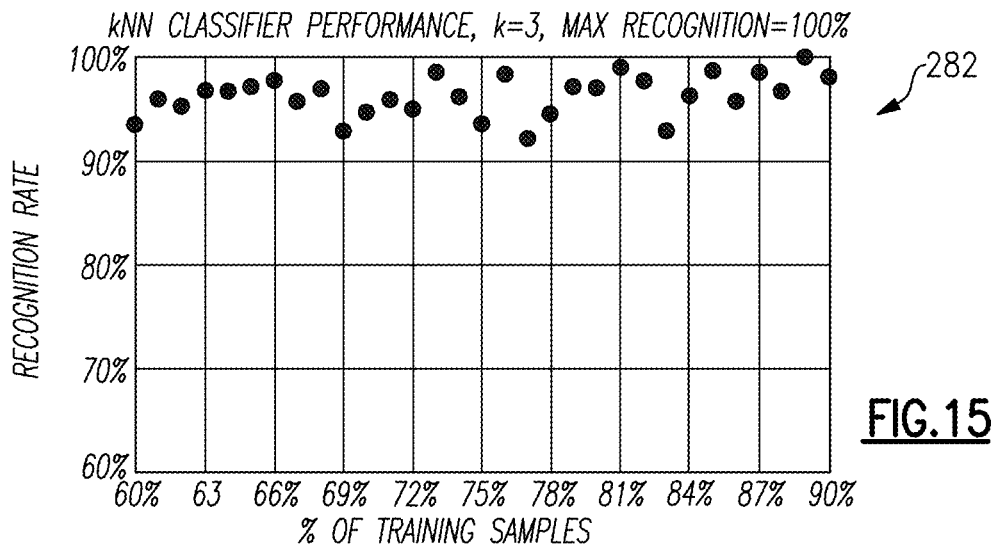
FIG. 15 shows an enlarged view of the plot of FIG. 14.

A first-round of experiments were conducted as follows: a kNN Euclidian Distance and a K=3 were trained and tested while varying the proportion of training-test samples. A range of 10% to 90% training and 90% to 10% test sets were analyzed. FIG. 14 shows a plot 280 of results from this experimental setting. FIG. 15 shows an enlarged view 282 of the 60% to 90% section of the plot 280 of FIG. 14.

From the example results of FIGS. 14 and 15, one can see that the classification stage as described herein yields promising results. The kNN classifier shows interesting peaks of 100% recognition rate at high training percentage by using the GSC algorithm.

Figure 16:
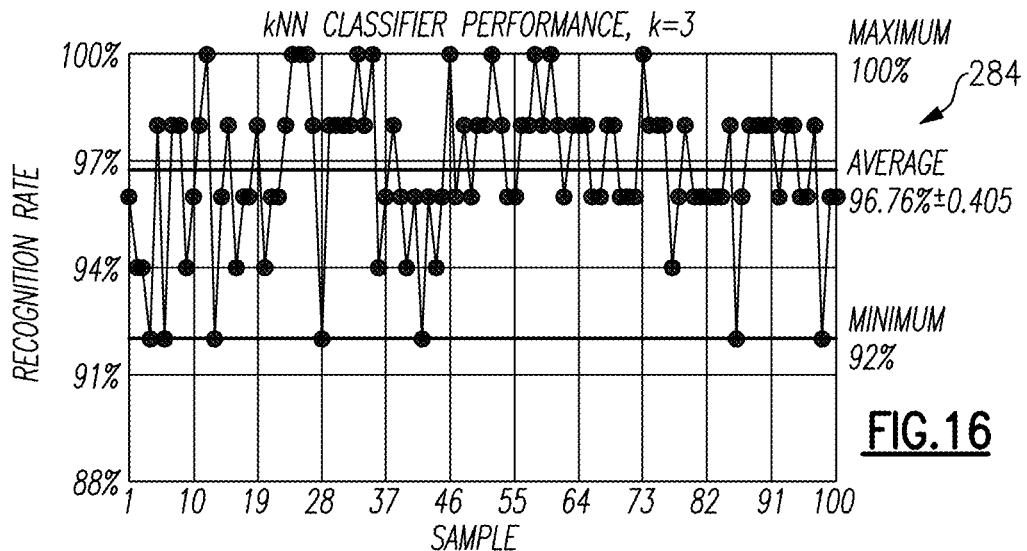
FIG. 16 shows a summary of statistics of the test results.

In order to assess more precisely the classification performance of the GCC+kNN technique, Monte Carlo cross-validation strategy was implemented. A total of 100 random data splits of 90% training and 10% test samples were analyzed. FIG. 16 shows a plot 284 of the results and selected statistics.

From the example results of FIG. 16, one can see that the implementation of the GSC algorithm and kNN classifier with Euclidian Distance shows an improvement for the readings of damaged or incomplete characters using optical character recognition, when compared to the pattern matching technique. For example, and as described herein, the pattern matching technique is assumed to have a recognition efficiency of approximately 95%. As shown in the example results of FIG. 16, the GSC algorithm/kNN classifier with Euclidian Distance technique has a recognition efficiency of approximately 96.76%±0.405.

It is noted that various examples are described herein in the context of recognition of numeric characters 0 to 9. However, it will be understood that one or more features of the present disclosure can also be utilized for enhanced recognition of other characters, including but not limited to, English alphabet characters, alphabet characters associated with non-English languages, and other optically recognizable symbols.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system for recognizing a character on a circuit board, the system comprising:
one or more processors; and
memory storing executable instructions that, when executed by the one or more processors, cause the one or more processors to perform operations including obtaining a digital image of the character, processing the digital image with a gradient, structural, and concavity algorithm, the processing including dividing the digital image into an array of regions, determining a coarse pixel density of the array by counting character pixels in the array, identifying one or more gradient features based at least in part on a stroke shape, identifying one or more structural features based at least in part on a stroke trajectory, and identifying one or more concavity features based at least in part on the coarse pixel density of the array, the operations further including classifying, using a k-nearest neighbor classifier algorithm and a distance metric, the character based at least in part on the one or more gradient features, the one or more structural features, and the one or more concavity features.

2. The system of claim 1 wherein the distance metric includes a Euclidian distance parameter.

3. The system of claim 1 wherein the identifying the one or more gradient features includes identifying one or more gradient features based at least in part on a stroke shape with respect to a first distance.

4. The system of claim 3 wherein the identifying the one or more structural features includes identifying one or more structural features based at least in part on a stroke trajectory with respect to a second distance, the second distance being greater than the first distance.

5. The system of claim 1 wherein the identifying one or more concavity features includes identifying one or more concavity features based at least in part on a stroke relationship across the image.

6. The system of claim 1 wherein the identifying the one or more gradient features includes performing two dimensional convolutions on the digital image with one or more Sobel operators.

7. The system of claim 1 wherein the identifying the one or more structural features includes adding one or more zero padded borders to the array and identifying a gradient pattern among one or more array elements immediately surrounding each non-padded border array element.

8. The system of claim 1 wherein the identifying the one or more concavity features further includes generating stroke information for the array by applying a histogram in each of horizontal pixels and vertical pixels.

9. The system of claim 8 wherein the identifying the one or more concavity features further includes generating upward, downward, left, right, and hole information for the array by using a ray to hit pixels to determine a presence of hole or character pixels in one or more directions.

10. The system of claim 1 wherein the character is a damaged character that has a readability characteristic below a readability threshold.

11. The system of claim 1 wherein identifying the one or more concavity features includes at least one of: counting character pixels in individual ones of the regions to determine a pixel density for individual ones of the regions, determining horizontal pixel strokes and vertical pixel strokes for individual ones of the regions, or using a ray to hit pixels in one or more directions to determine a presence of at least one of a hole pixel or a character pixel in individuals ones of the regions.

12. A system for recognizing a character on a circuit board, the system comprising:
one or more processors; and
memory storing executable instructions that, when executed by the one or more processors, cause the one or more processors to perform operations including processing a digital image of the character with a gradient, structural, and concavity algorithm, the processing including dividing the digital image into multiple regions, identifying one or more gradient features based at least in part on a stroke shape, identifying one or more structural features based at least in part on a stroke trajectory, and identifying one or more concavity features based at least in part on a stroke relationship, the operations further including identifying, using a k-nearest neighbor classifier algorithm and a distance metric, the character based at least in part on the one or more gradient features, the one or more structural features, and the one or more concavity features, the identifying the one or more concavity features including at least one of: counting character pixels to determine a pixel density, determining horizontal pixel strokes and vertical pixel strokes, or using a ray to hit pixels in one or more directions to determine a presence of at least one of a hole pixel or a character pixel.

13. The system of claim 12 wherein the distance metric includes a Euclidian distance parameter.

14. The system of claim 12 wherein the identifying the character includes identifying a numerical value of the character, the numerical value including a number between 0 and 9.

15. The system of claim 12 further comprising an imaging sensor to capture the digital image; and a production system to fabricate the circuit board with the character imprinted thereon, the character providing information about the circuit board.

16. The system of claim 12 wherein each region of the multiple regions is associated with multiple pixels.

17. A method comprising:
capturing, with an imaging sensor, a digital image of a character on a circuit board;
dividing the digital image into multiple regions;
identifying, by a system that includes one or more processors, one or more gradient features for the digital image based at least in part on a stroke shape;
identifying, by the system, one or more structural features for the digital image based at least in part on a stroke trajectory;

identifying, by the system, one or more concavity features for the multiple regions of the digital image by at least one of: counting character pixels to determine a pixel density, determining horizontal pixel strokes and vertical pixel strokes, or using a ray to hit pixels in one or more directions to determine a presence of at least one of a hole pixel or a character pixel; and classifying, using a k-nearest neighbor classifier algorithm and a distance metric, the character based at least in part on the one or more gradient features, the one or more structural features, and the one or more concavity features.

18. The method of claim 17 wherein the distance metric includes a Euclidian distance parameter.

19. The method of claim 17 wherein the identifying the character includes identifying a numerical value of the character, the numerical value including a number between 0 and 9.

20. The method of claim 17 wherein the character is a damaged character that has a readability characteristic below a readability threshold.

\* \* \* \* \*